US007600488B2

(12) United States Patent
Mann (10) Patent No.: US 7,600,488 B2
(45) Date of Patent: Oct. 13, 2009

(54) TREAT DISPENSING PET TOY AND TREATS THEREFOR

(75) Inventor: Charles D. Mann, Burnsville, MN (US)

(73) Assignee: Premier Pet Products, LLC, Midlothian, VA (US)

( * ) Notice: Subject to any disclaimer, the term of this patent is extended or adjusted under 35 U.S.C. 154(b) by 1255 days.

(21) Appl. No.: 10/653,404

(22) Filed: Sep. 2, 2003

(65) Prior Publication Data

US 2005/0045115 A1    Mar. 3, 2005

(51) Int. Cl.
*A01K 29/00* (2006.01)
(52) U.S. Cl. ..................................................... 119/710
(58) Field of Classification Search .................. 119/702, 119/707–711
See application file for complete search history.

(56) References Cited

U.S. PATENT DOCUMENTS

| | | | |
|---|---|---|---|
| 1,006,182 A | 10/1911 | Cousin | |
| 1,022,112 A | 4/1912 | Smith | |
| 1,031,095 A | 7/1912 | Smith | |
| 1,534,964 A | 4/1925 | Kahnweiler | |
| 2,086,631 A | 4/1936 | Munro | 272/86 |
| 3,372,846 A | 3/1968 | Berkus | 222/479 |
| 4,907,537 A * | 3/1990 | Shirk | 119/707 |
| 5,232,130 A | 8/1993 | Woodard | 222/464 |
| 5,553,570 A | 9/1996 | VanNatter, III et al. | 119/709 |
| 5,595,142 A * | 1/1997 | Chill | 119/710 |
| 5,819,690 A | 10/1998 | Brown | 119/707 |
| 5,865,146 A * | 2/1999 | Markham | 119/707 |
| 5,965,182 A | 10/1999 | Lindgren | 426/104 |
| 6,148,771 A * | 11/2000 | Costello | 119/709 |
| 6,405,681 B1 * | 6/2002 | Ward | 119/707 |
| 6,415,741 B2 * | 7/2002 | Suchowski et al. | 119/711 |
| 6,427,634 B1 * | 8/2002 | Mann | 119/709 |
| 6,526,912 B1 | 3/2003 | Ottoson | 119/51.01 |
| 6,609,944 B1 * | 8/2003 | Viola | 446/409 |
| 6,634,318 B1 * | 10/2003 | Rucker | 119/709 |
| 2003/0079693 A1 | 5/2003 | Jager | 119/707 |

FOREIGN PATENT DOCUMENTS

GB    2 253 329 A    9/1992

OTHER PUBLICATIONS

"Kong Stuffing" Advertisement, *Pet Business* Magazine, May 1995.
"Recipe for the Perfect Dog", Kong Company brochure, 1997.

* cited by examiner

*Primary Examiner*—Thomas Price
(74) *Attorney, Agent, or Firm*—Leanne Taveggia Farrell; Westman, Champlin & Kelly, P.A.

(57) ABSTRACT

A non-consumable pet toy includes a body having a first treat-retaining cavity and a first opening that extends between the first treat-retaining cavity and an outer surface of the body. The non-consumable pet toy also includes a metering device in the first opening that dispenses treats from the first treat-retaining cavity through the first opening at a metered rate. The first treat-retaining cavity being refillable through the metering device.

17 Claims, 10 Drawing Sheets

TREAT DISPENSING PET TOY AND TREATS THEREFOR

BACKGROUND OF THE INVENTION

This invention relates to pet toys, and more particularly to toys for carnivorous animals such as dogs and cats.

Non-consumable pet toys for pet carnivores, such as dogs and cats, provide a variety of beneficial functions for the pet. Chewing on non-consumable toys furnish an outlet for masticatory exercises, dental prophylaxis, relief while teething, boredom, loneliness, separation anxiety and exploration. To enhance the attractiveness of the toy to the pet carnivore, sensory attachments are incorporated into the toy. These attractants are either an integral part of the toy and permanently molded into the material of the toy or are replaceable and retained in an attractant-retaining portion of the toy.

Some toys retaining a replaceable attractant have hollow cavities designed to permit insertion of an attractant, such as a treat. The cavities loosely retain a portion of the treat and the treat may be easily crushed and dispelled by the pet carnivore. In some cases, the shear strength of the attractant or treat is inadequate to withstand the force needed for insertion of the treat in other treat retaining toys, so that the attractant often breaks into small pieces upon attempting to insert it. The small pieces of the broken treat are too small to be retained correctly and render the toy relatively useless as an attractant holder.

Most pet toys are used by animal handlers and owners to encourage social interaction between the handler and the animal. In addition, pet toys are used to occupy the pet when the owners are absent and need to leave the dog alone. Hence, commercially successful pet toys are attractive to the owner or handler, are easy to use, and retain the interest of the animal for a considerable period of time. Most pet owners and handlers purchase pet toys that have multiple attractive appendages.

SUMMARY OF THE INVENTION

The present invention is directed towards a non-consumable pet toy. The non-consumable pet toy includes a body having a first treat retaining cavity and a first opening that extends between the treat retaining cavity and an outer surface of the body. The non-consumable pet toy also includes a metering device in the first opening that dispenses treats from the treat-retaining cavity through the opening at a metered rate. The treat-retaining cavity is refillable through the metering device.

The present invention is also directed towards a loading device configured to retain a plurality of treats to be loaded into a pet toy. The loading device includes a body member having an open end and a closed end. The body member is so disposed and arranged that the open end can be inserted through an opening and a metering device of the pet toy. The loading device also includes a removable cap closing the open end of the body member and a plurality of treats in the body member.

DETAILED DESCRIPTION OF THE PREFERRED EMBODIMENTS

Figure 1:
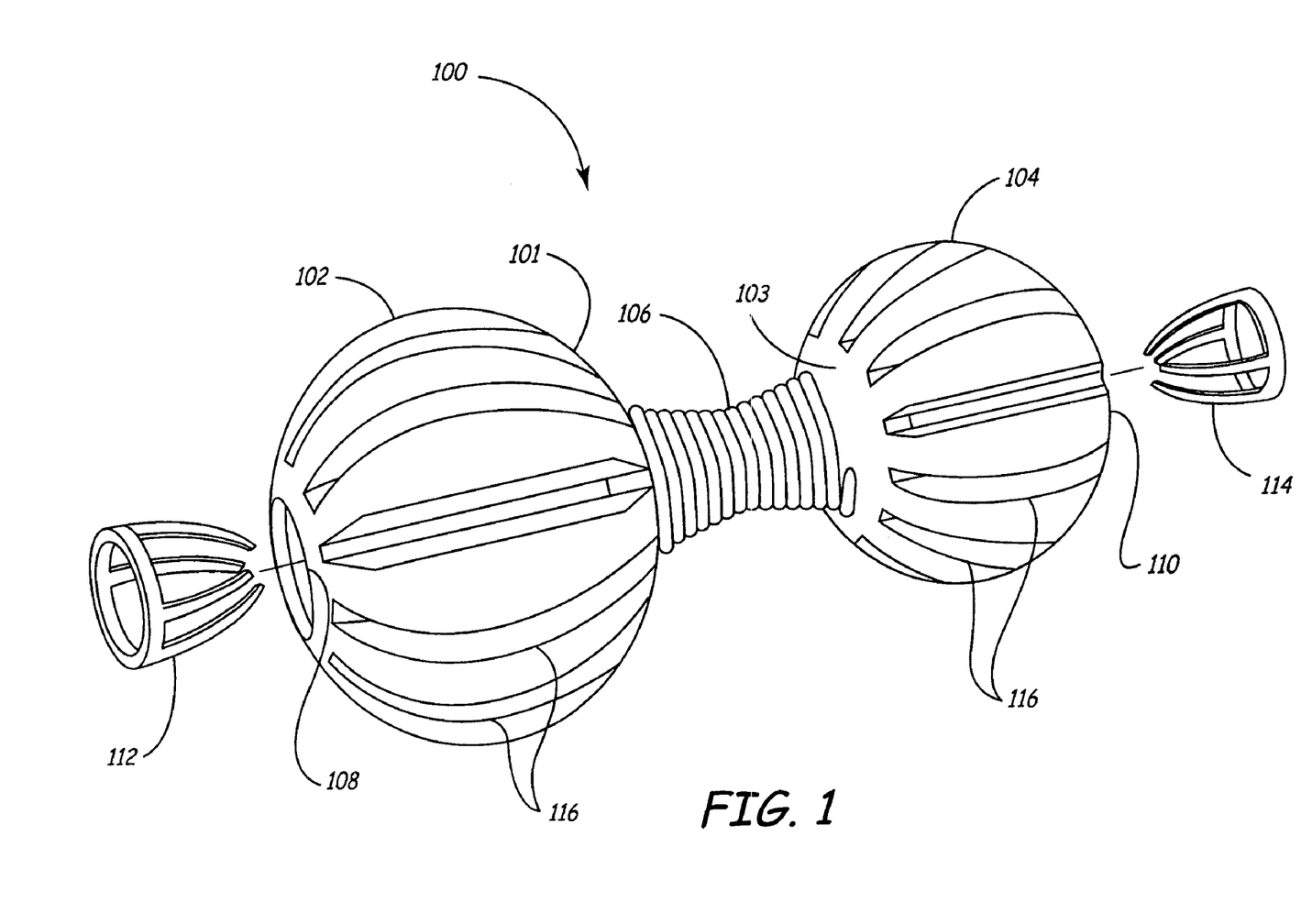
FIG. 1 is a perspective exploded view of a pet toy in accordance with a first embodiment of the present invention.

FIG. 1 is an exploded perspective view of a treat dispensing pet toy 100 in accordance with an embodiment of the present invention. Pet toy 100 includes resilient molded body 101 having outer surface 103. Body 101 includes first hollow body 102, which forms a treat-retaining cavity, having first opening 108. Body 101 also includes second hollow body 104, which forms a treat-retaining cavity, having second opening 110. Openings 108 and 110 extend between outer surface 103 and the treat retaining cavity. First hollow body 102 is joined to second hollow body 104 by coupling member 106. Pet toy 100 also includes first metering device 112 and second metering device 114 in respective first opening 108 and second opening 110. As shown in FIG. 1, first hollow body 102, second hollow body 104, coupling member 106, first meter 112 and second meter 114 are all constructed of a non-consumable, resilient or flexible material, such as a non-toxic elastomer or neoprene plastic. Those skilled in the art will appreciate, though, that meters 112 and 114 can be made of a material that is different from first hollow body 102, second hollow body 104 and coupling member 106. For example, meters 112 and 114 can be made of a non-consumable stiff material, such as a rigid nylon and the like, while first hollow body 102, second hollow body 104 and coupling member 106 can be made of the flexible material discussed above. In the alternative, meters 112 and 114 can be made of the flexible material and first hollow body 102, second hollow body 104 and coupling member 106 can be made of the stiff material. Regardless, first hollow body 102, second hollow body 104, coupling member 106, first meter 112 and second meter 114 are molded parts and are positioned together with an adhesive.

First hollow body 102 and second hollow body 104 each have a plurality of grooves 116 on outer surface 103. Grooves 116 provide a dental prophylaxis outlet for carnivorous teeth. In addition, grooves 116 provide attractive features to pet toy 100 such that an owner or handler is attracted to the toy. In addition, coupling member 106 can contain a "squeaker" or playful noise that is induced when pet toy 100 is bounced. This feature provides an additional attractive feature for the carnivorous animal as well as the owner or handler.

First meter 112 and second meter 114 serve to dispense treats out of the treat-retaining cavities formed by first hollow body 102 and second hollow body 104. As an animal chews, rolls and/or tosses pet toy 100, first meter 112 and second meter 114 dispense treats out of first hollow body 102 and second hollow body 104 at a metered rate. The rate of dispensing will depend on the size of the treats, weight of the treats, shape of the treats, the quantity of treats within the treat-retaining cavities, aggressiveness of the carnivore in moving or shaking the toy and extent of deformity of the toy and meter by the carnivore.

Figure 2:
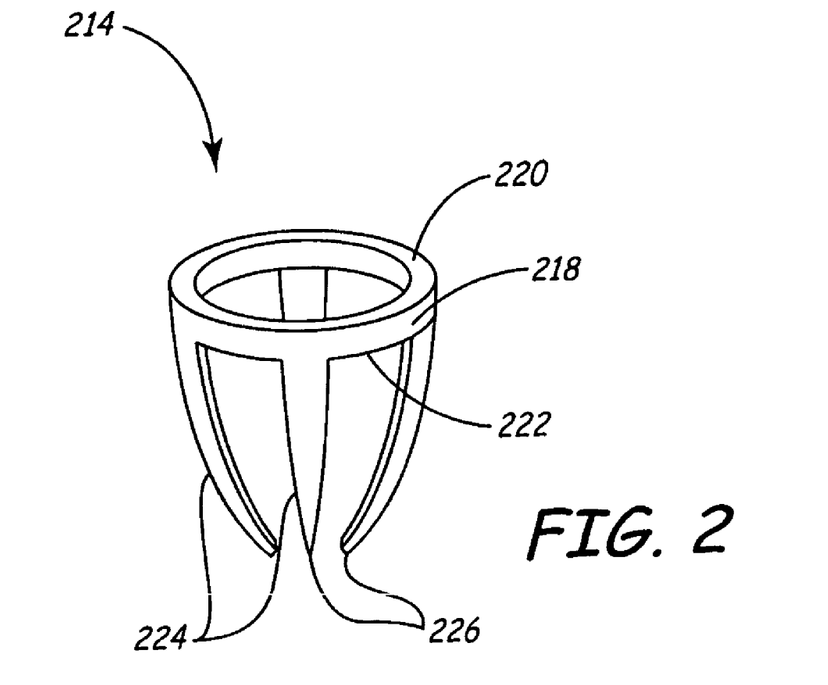
FIG. 2 is a perspective view of a treat-dispensing meter in accordance with an embodiment of the present invention.

FIG. 2 illustrates a perspective view of a meter 214 in accordance with an embodiment of the present invention. Meter 214 includes an annulus 218 having a first surface 220 and a second surface 222. A plurality of elongated members or fingers 224 extend from second surface 222 of annulus 218, terminating at points 226 distal from annulus 218. In the embodiment of FIG. 2, fingers 224 are curved so that points 226 are arranged in a generally circular arrangement at a diameter smaller than the diameter of annulus 218. The plurality of narrow fingers 224 extend into the treat-retaining cavity as the toy, such as toy 100, to meter treats out of the hollow body, such as first hollow body 102 and second hollow body 104. The geometry of the plurality of fingers 224 provide a metered rate of treat dispensing out of a first hollow body and a second hollow body. Although FIG. 2 illustrates meter 214 having four fingers, those skilled in the art will appreciate that any number of fingers may be used as long as the distance between fingers is proportionate to the size of the cavity and size of the treat to properly meter treats at a metered rate. When the owners or handlers are absent and need to leave the pet carnivore alone, the metering of treat-dispensing provided by meter 214 occupies the pet carnivore for a significant period of time.

Figure 3:
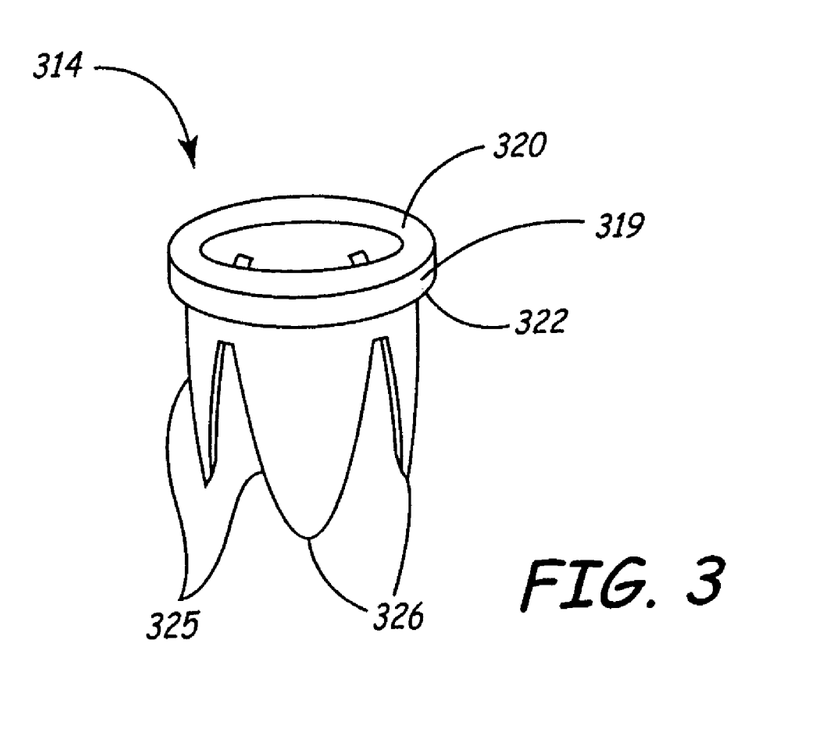
FIG. 3 is a perspective view of a treat-dispensing meter in accordance with an embodiment of the present invention.

FIG. 3 illustrates a perspective view of meter 314 in accordance with another embodiment of the present invention. Meter 314 includes annulus 319 having a first surface 320 and a second surface 322. Meter 314 also includes a plurality of elongated members or tongues 325 which extend from second surface 322, terminating at distal ends 326. Tongues 325 are arranged in a generally circular pattern, forming a slotted cylinder with annulus 319. Annulus 319 laterally protrudes from tongues 325 to form a ledge. The geometry of the plurality of broad tongues 325 provide a metered rate of treat-dispensing out of a hollow body. When the owners or handlers are absent and need to leave the pet carnivore alone, the metered rate of treat-dispensing provided by meter 314 occupies the pet carnivore for a significant period of time.

Meter 214 and meter 314 operate differently from each other after they have been adhered to a pet toy, such as pet toy 100. The plurality of fingers 224 of meter 214 meter the dispensing of treats. The treats are directed by the inside surface of the toy body through spaces between the fingers. On the other hand, the plurality of tongues 325 of meter 314 block treats which are located on the inner sides of a hollow body, and allow treats to be metered through the circular pattern formed by the sides of the tongues. In both cases, however, the resilience of the toy body and/or the meter allows the spacing between the fingers or tongues to be changed when the carnivore bites on the toy.

Figure 4:
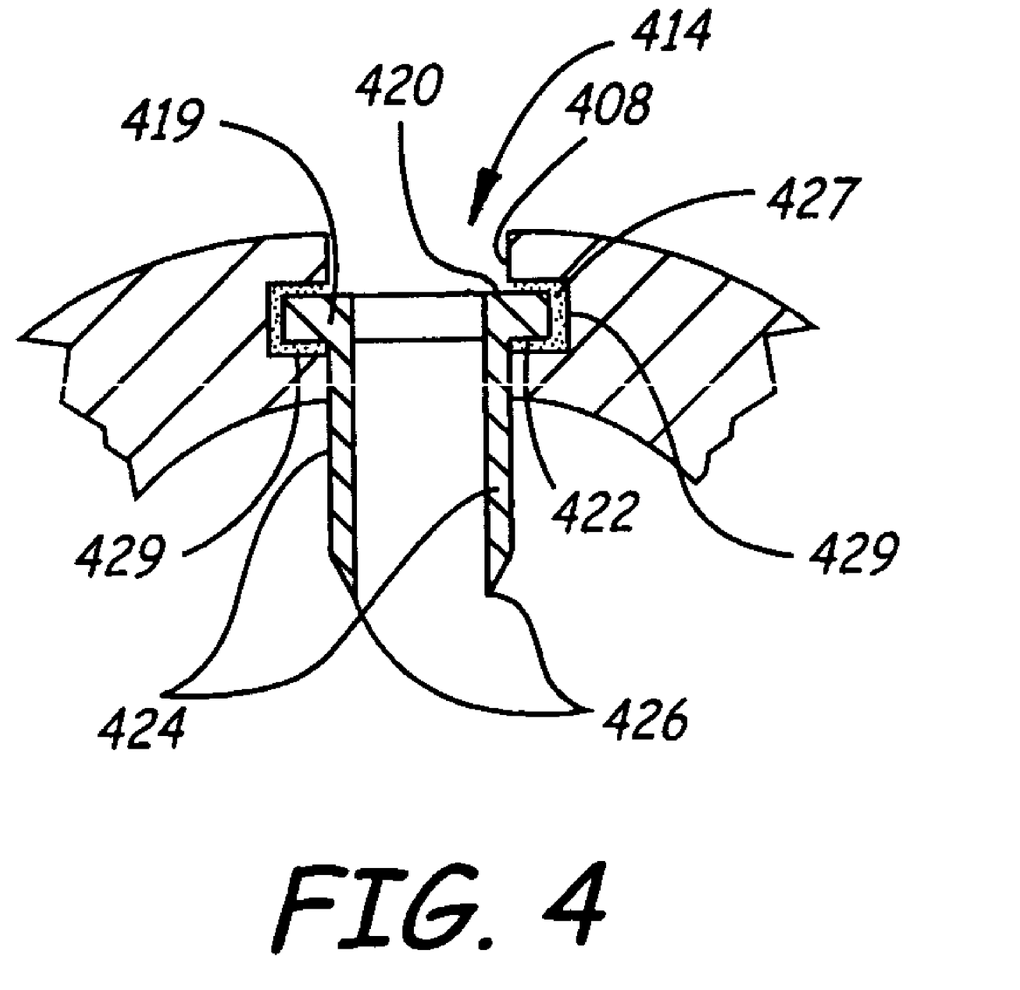
FIG. 4 is a section view of a treat-dispensing meter in accordance with an embodiment of the present invention.

FIG. 4 is a section view of treat-dispensing meter 414 positioned in opening 408 of a treat-retaining cavity in accordance with an embodiment of the present invention. Meter 414 includes annulus 419 having a first surface 420 and a second surface 422. First surface 420 is adjacent outer surface 403 of the treat-retaining cavity. Meter 414 also includes a plurality of fingers 424 which extend from second surface 422, terminating at distal ends 426. Fingers 424 curve so that points 426 are arranged in a generally circular arrangement at a diameter smaller than the diameter of annulus 419. Annulus 419 protrudes from fingers 424 to form a ledge. The plurality of narrow fingers 424 meter treats out of a hollow body, such as first hollow body 102 and second hollow body 104 of FIG. 1. The geometry of the plurality of fingers 424 provide a metered rate of treat dispensing out of the first hollow body and the second hollow body.

Opening 408 includes constricted portion 431 and seat portion 429. Seat portion 429 is sized to receive the ledge of annulus 419. Constricted portion 431 is sized to resist removal of annulus 419 from seat portion 429. Although meters 214, 314 and 414 all use an adhesive, such as adhesive 427, to adhere meter 414 to a pet toy, annulus 419 of meter 414 also snaps through constricted portion 431 into seat portion 429 of opening 408.

Figure 5A:
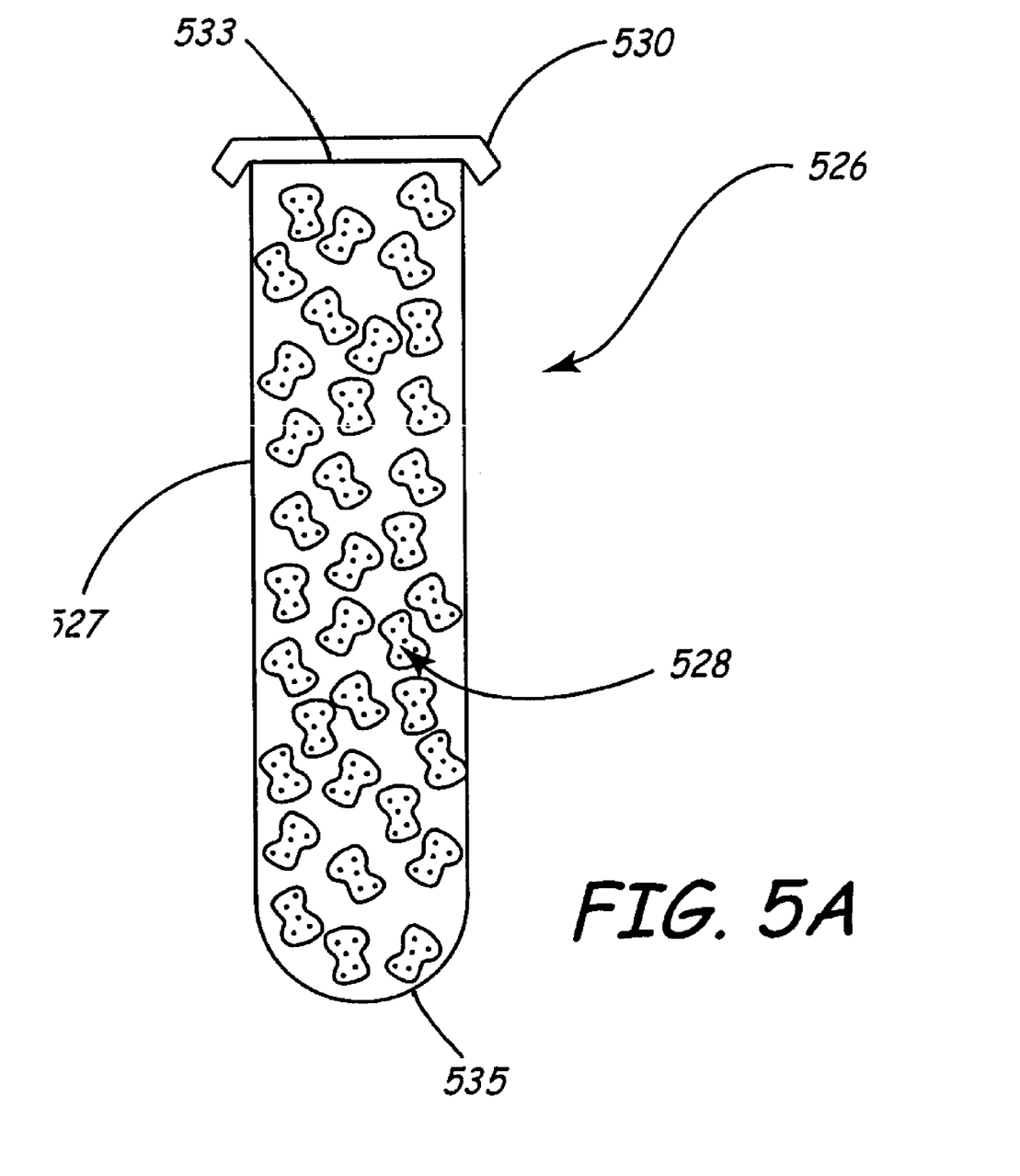
FIG. 5A is a side view of a disposable loading device for loading treats into a pet toy in accordance with the present invention.

FIG. 5A is a section view of disposable loading device 526 for loading a plurality of treats 528 into a pet toy in accordance with the present invention. Disposable loading device 526 includes body member 527 having an open end 533 and a closed end 535. Body member 527 is so disposed and arranged that the open end 533 can be inserted through an opening, such as opening 108 and opening 110 of FIG. 1, and a metering device, such as metering device 114 of FIG. 1. Disposable loading device 526 also includes a removable cap 530 which closes open end 533 of body member 527. A plurality of treats 528 is housed within body member 527.

Figure 5B:
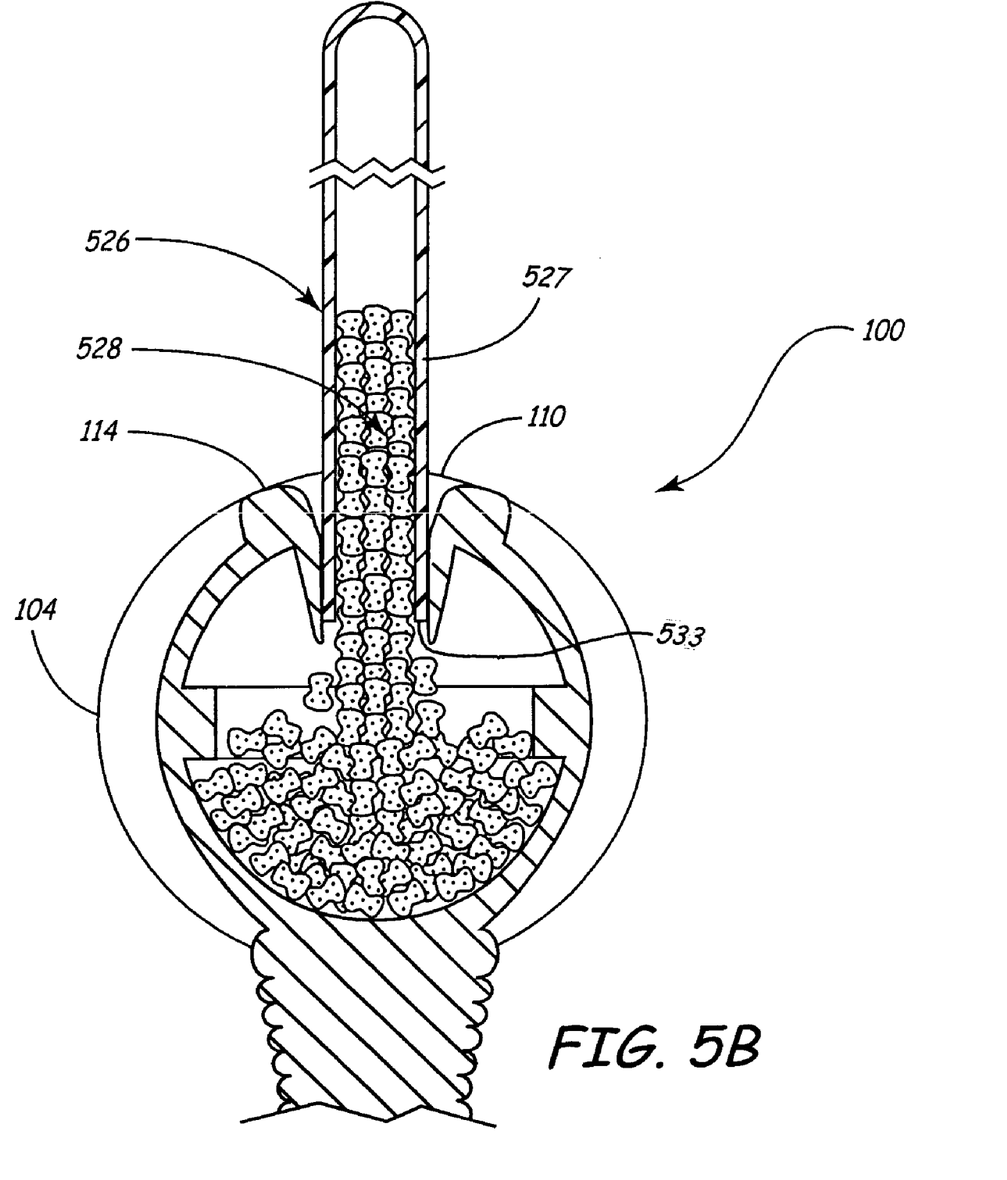
FIG. 5B is a section view of disposable loading device loading a plurality of treats into a pet toy in accordance with an embodiment of the present invention.

FIG. 5B is a section view of disposable loading device 526 loading a plurality of treats 528 into pet toy 100. Loading device 526 is pre-loaded with a quantity of treats ideal for a single loading of a cavity of hollow body 102 or 104. As shown in FIG. 5B, body member 527 of loading device 526 is sized to fill a single hollow body with treats.

The removable cap of loading device 526 is removed and open end 533 is inserted into an opening of a hollow body. For example, FIG. 5B illustrates loading device 526 inserted through opening 110 and meter 114 of hollow body 104. Gravity expels the plurality of treats 528 into hollow body 104. For example, body member 527 can have a cylindrical shape as illustrated in FIGS. 5A and 5B, or a funnel shape. Although FIG. 5B illustrates the plurality of treats 528 being expelled from open end 533 into a treat-retaining cavity, the loading device may include a plunger (not shown) to expel into the treat-retaining cavity.

Figure 6:
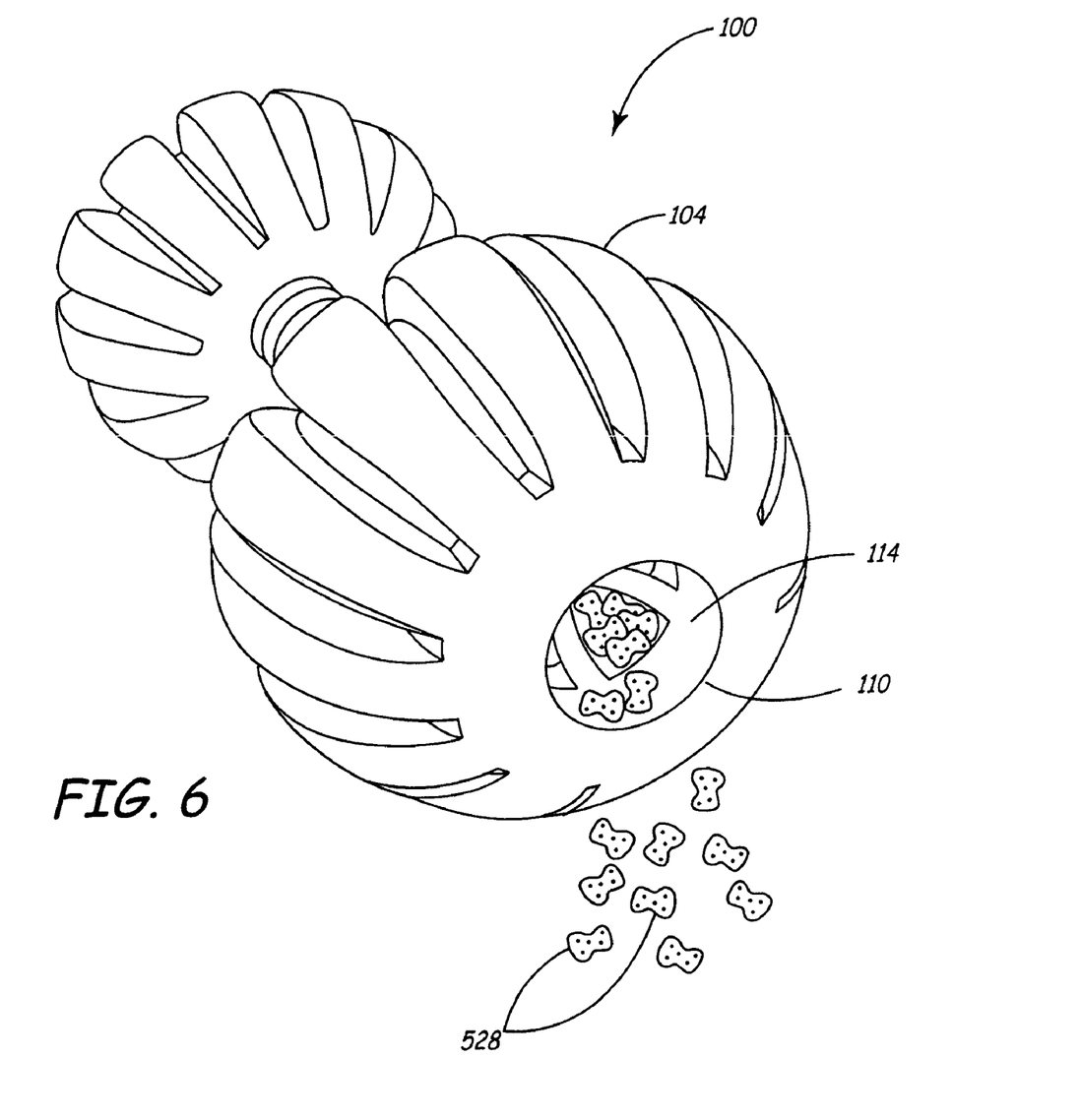
FIG. 6 is a perspective view of treats being dispensed from the pet toy shown in FIG. 1.

In preferred embodiments, the plurality of treats 528 may be rigid granular or loose fitting treats as well as treats that are "puffed" to a granular shape. A deformable paste treat, such as peanut butter or canned dog food, may also be used, as may kibbles of treats held with a binder. Where granular treats are used, the plurality of treats 528 have a geometrical shape which is relative to meter 114 and hollow body 104 such that meter 114 can dispense treats in a metered rate. For example, FIG. 6 is a perspective view of the plurality of treats 528 being dispensed by meter 114 out of pet toy 100 after the plurality of treats 528 have been loaded into second hollow body 104 through opening 110 and meter 114.

Figure 7:
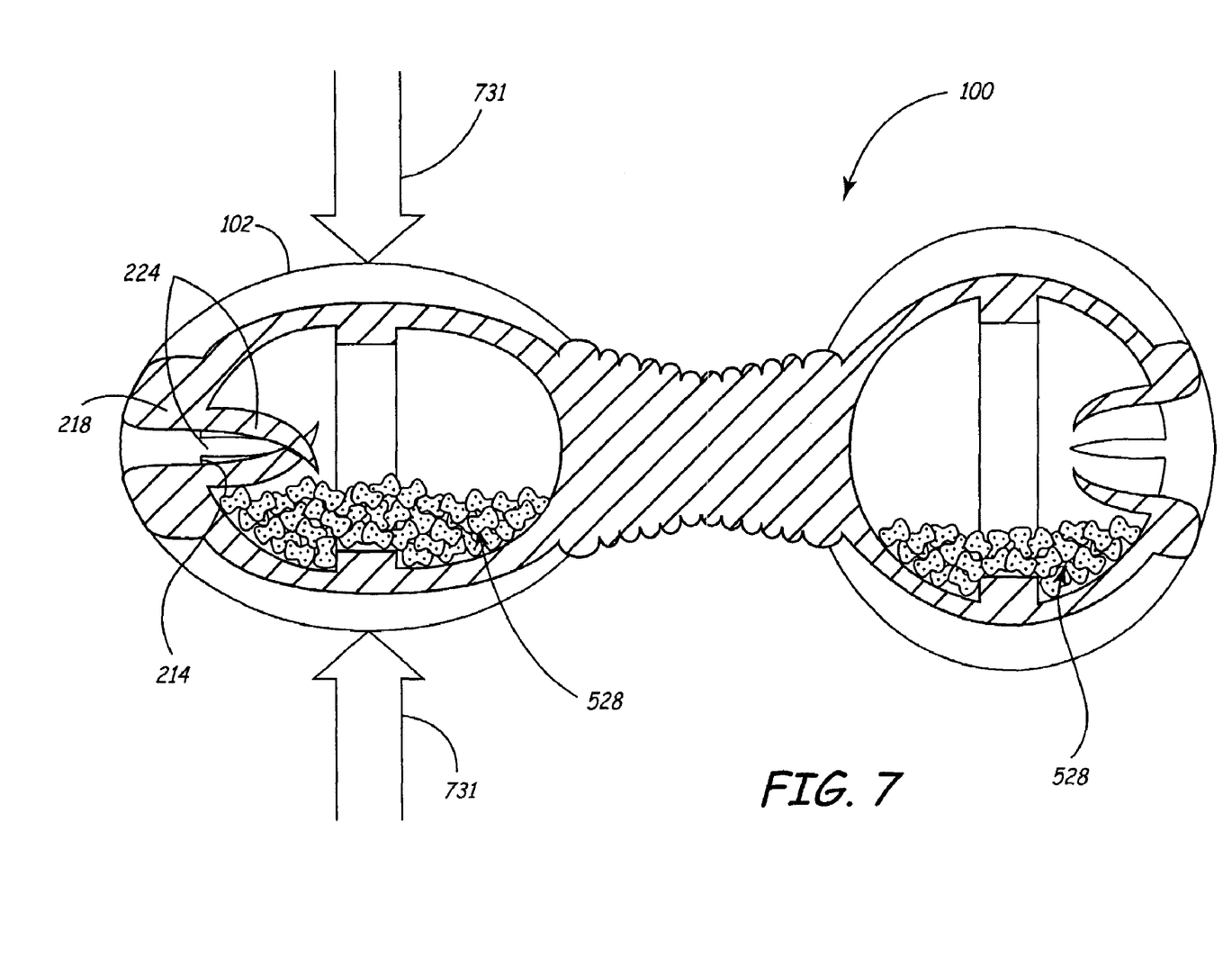
FIG. 7 is a section view of the pet toy shown in FIG. 1 in a deformed state.

FIG. 7 is a section view of pet toy 100 in a deformed state. Besides a pet carnivore rolling pet toy 100 such that treats may be metered out, the pet carnivore can also apply a force to deform the toy in the direction 731 upon first hollow body 102. Such a force is created by jaws of the pet carnivore which chew and/or bite first hollow body 102 of pet toy 100. The force can also be caused by other actions of the pet carnivore. For example, the pet carnivore can press on hollow body 102 with its paws. In the case of meter 214 of FIG. 2 and as shown in FIG. 7, the applied force causes the plurality of fingers 224 to change its position within a hollow body to close around annulus 218. This action diminishes the rate of dispensing treats 528 from a hollow body. In the case of meter 314 of FIG. 3, the force causes the plurality of tongues 325 of meter 314 to collapse on the axis of the meter, which enlarges some spaces between tongues 325. Tongues 325 tend to move towards annulus 319, closing the circular opening at end 326, thereby changing the rate of dispensing treats 528 from a hollow body.

Figure 8:
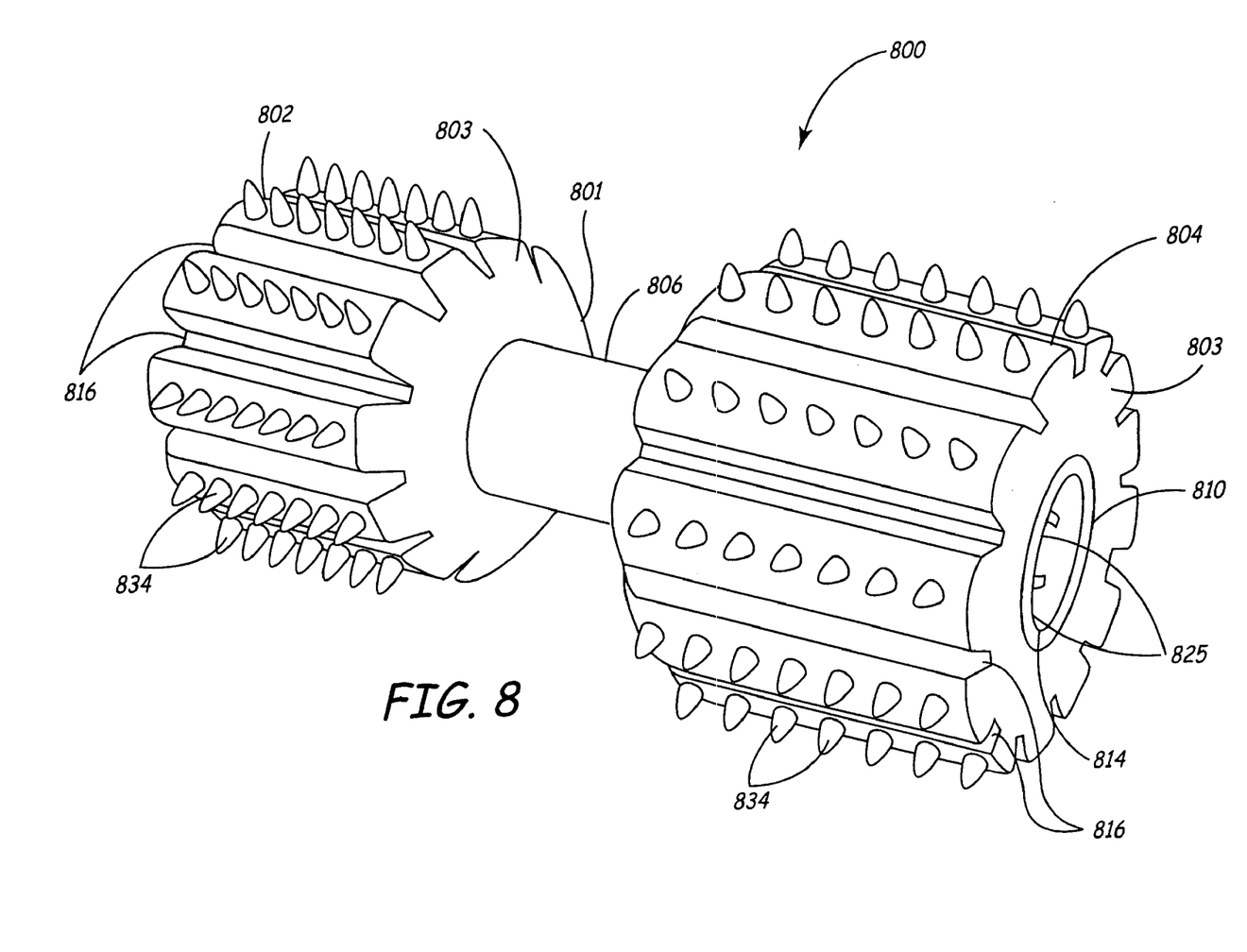
FIG. 8 is a perspective view of a pet toy in accordance with another embodiment of the present invention.

FIG. 8 illustrates a perspective view of pet toy 800 in accordance with another embodiment of the present invention. Pet toy 800 includes resilient molded body 801 having outer surface 803. Body 801 includes first hollow body 802 joined to a second hollow body 804 by coupling member 806. First hollow body 802 which forms a treat-retaining cavity, has first opening (not shown) and second hollow body 804, which forms a treat-retaining cavity, has second opening 810. The first opening and opening 810 extend between outer surface 803 and the treat-retaining cavity. Pet toy 800 also includes first meter (not shown) and second meter 814 in second opening 810. As shown in FIG. 8, first hollow body 802, second hollow body 804, coupling member 806, the first meter and second meter 814 are all constructed of a non-consumable, resilient or flexible material, such as a non-toxic elastomer or neoprene plastic. Those skilled in the art will appreciate, through, that the first meter and second mete 814 can be made of a material that is different from first hollow body 802, second hollow body 804 and coupling member 806. Examples are discussed in FIG. 1. Regardless, first hollow body 802, second hollow body 804, coupling member 806, the first meter and second meter 814 are made of molded parts positioned together with an adhesive.

First hollow body 802 and second hollow body 804 each have a plurality of grooves 816 and a plurality of protrusions 834 on outer surface 803. Grooves 816 and protrusions 834 provide a dental prophylaxis outlet for carnivorous teeth. In addition, grooves 816 and protrusions 834 provide attractive features to pet toy 800 such that an owner or handler is attracted to the toy.

The first meter and second meter 814 serve to meter treats out of first hollow body 802 and second hollow body 804, respectively. As an animal chews, rolls and/or tosses pet toy 800, the first meter and second meter 814 dispense treats out of first hollow body 802 and second hollow body 804 at a metered rate. The rate of dispensing is related to many factors including those discussed above. The first meter and second meter 814 can have a plurality of fingers 824 extending into first hollow body 802 and second hollow body 804, respectively, such as the plurality of fingers 224 illustrated in FIG. 2. In the alternative, the first meter and second meter 814 can have a plurality of tongues 825 extending into first hollow body 802 and second hollow body 804, respectively, such as the plurality of tongues 325 illustrated in FIG. 3.

Figure 9:
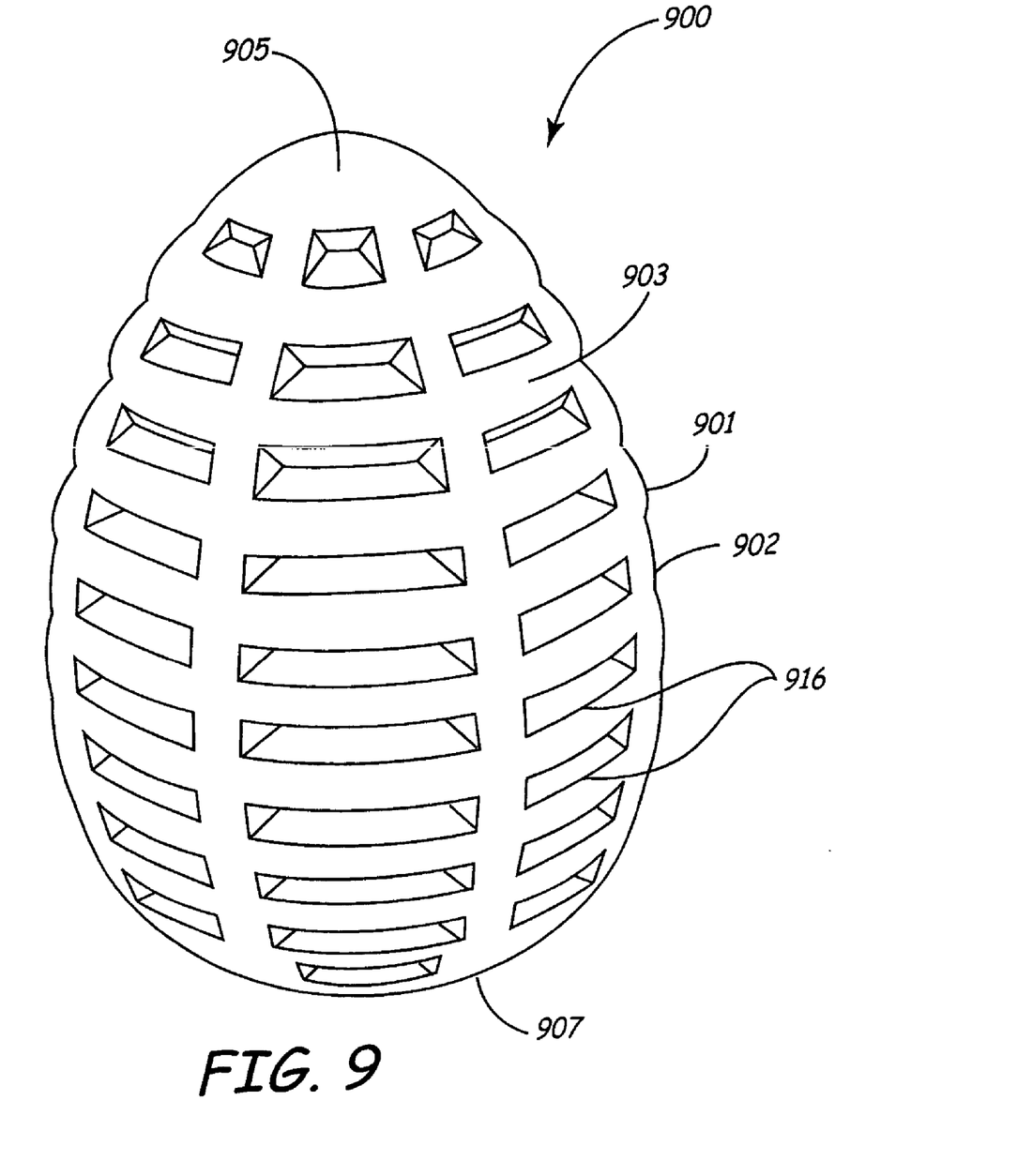
FIG. 9 is a perspective view of a pet toy in accordance with yet another embodiment of the present invention.

FIG. 9 illustrates a perspective view of pet toy 900 in accordance with yet another embodiment of the present invention. Pet toy 900 includes resilient molded body 901 having outer surface 903. Body 901 includes single hollow body 902 having first end 905 and second end 907. Single hollow body 902, which forms a treat-retaining cavity, has an opening (not shown) located on second end 907. The opening extends between outer surface 903 and the treat-retaining cavity. Although blocked from view in FIG. 9, pet toy 900 also includes a meter (not shown) in the opening. Hollow body 902 and the meter are both constructed of a non-consumable, resilient or flexible material, such as a non-toxic elastomer or neoprene plastic. Those skilled in the art will appreciate, though, that the meter can be made of a material that is different from hollow body 902. Examples are discussed in previous embodiments. Regardless, hollow body 802 and the meter are made of molded parts positioned together with an adhesive.

Single hollow body 902 has a plurality of recesses 916 on outer surface 903. Recesses 916 provide a dental prophylaxis outlet for carnivorous teeth. In addition, recesses 916 provide attractive features to pet toy 900 such that an owner or handler is attracted to the toy.

The meter serves to meter treats out of single hollow body 902. As an animal chews, rolls and/or tosses pet toy 900, the meter dispenses treats out of single hollow body 902 at a metered rate. The rate of dispensing depends on many factors including those that are discussed above. The meter can have a plurality of fingers extending into single hollow body 902, such as the plurality of fingers 224 illustrated in FIG. 2. In the alternative, the meter can have a plurality of tongues extending into single hollow body 902, such as the plurality of tongues 325 illustrated in FIG. 3.

Figure 10:
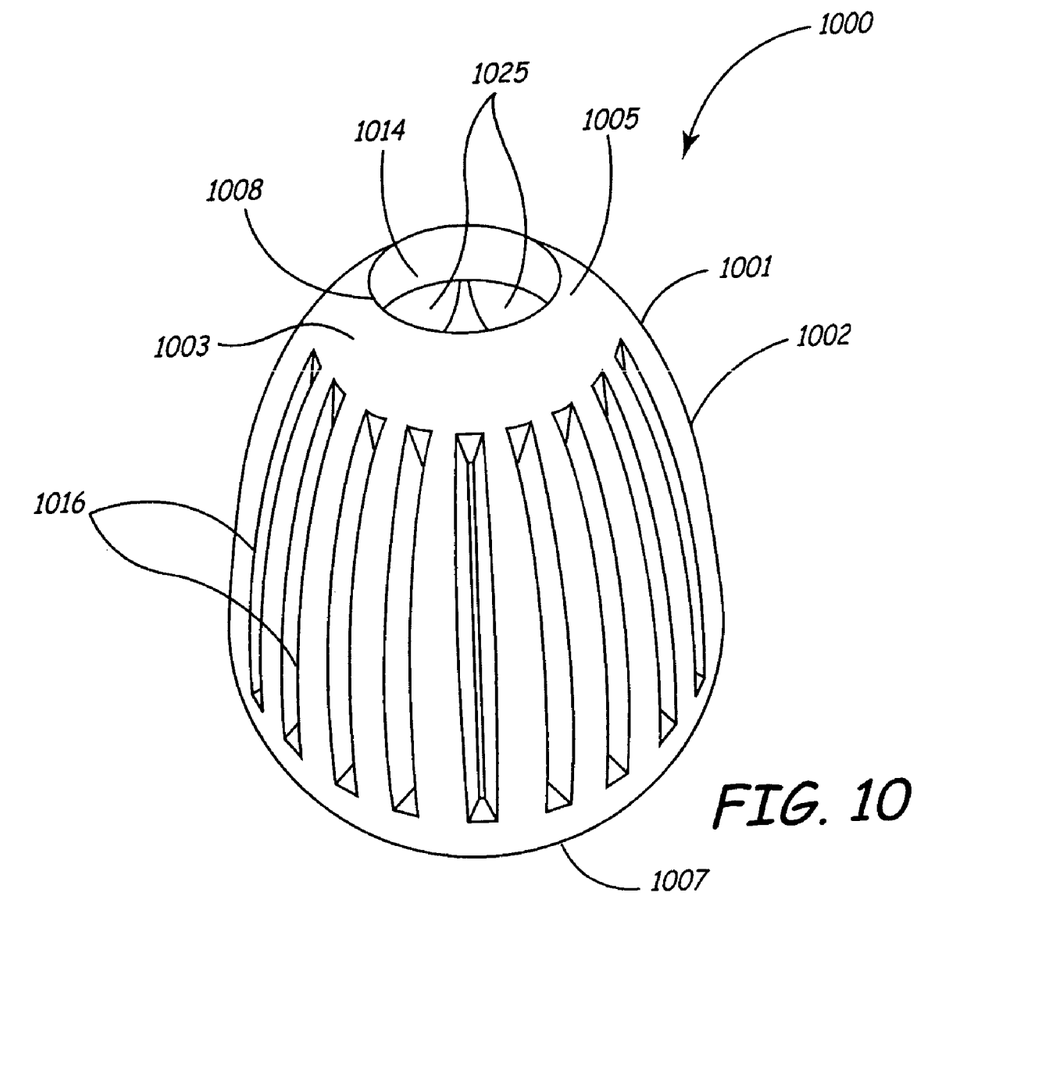
FIG. 10 is a perspective view of a pet toy in accordance with yet another embodiment of the present invention.

FIG. 10 is a perspective view of pet toy 1000 in accordance with yet another embodiment of the present invention. Pet toy 1000 includes a resilient body member 1001 having an outer surface 1003. Body 1001 includes a single hollow body 1002 having a first end 1005 and a second end 1007. Single hollow body 1002, which forms a treat-retaining cavity, has an opening 1008 located on first end 1005, which extends between outer surface 1003 and the treat-retaining cavity. Pet toy 1000 also includes a meter 1014. Single hollow body 1002 and meter 1014 are both constructed of a non-consumable, resilient or flexible material, such as a non-toxic elastomer or neoprene plastic. Those skilled in the art will appreciate, though, that meter 1014 can be made of material that is different from hollow body 1002. Examples are discussed in previous embodiments. Regardless, hollow body 1002 and meter 1014 are molded parts positioned together with an adhesive.

Hollow body 1002 has a plurality of grooves 1016 on outer surface 1003. Grooves 1016 provide a dental prophylaxis outlet for carnivorous teeth. In addition, grooves 1016 provide attractive features to pet toy 1000 such that an owner or handler is attracted to the toy.

Meter 1014 serves to meter treats out of single hollow body 1002. Meter 1014 can have a plurality of tongues 1025 extending into single hollow body 1002, such as the plurality of tongues 325 illustrated in FIG. 3. In the alternative, meter 1014 can have a plurality of fingers extending into single hollow body 1002, such as the plurality of fingers 224 illustrated in FIG. 2.

In both embodiments of FIGS. 9 and 10, larger ends 907, 1007 are heavier than smaller ends 905, 1005. The toys tend to "stand" on larger ends 907, 1007 when at rest. Consequently, the rate of dispensing treats through openings 908, 1008 and meters 914, 1014 are affected by the many factors discussed above as well as affected by the motion of toys 900, 1000 and their tendency to "stand" on larger ends 907, 1007. In some embodiments, the action of toys 900, 1000 to stand on their larger ends 907, 1007 may be enhanced by a molded weight (not shown) positioned at second ends 907, 1007. This weight causes pet toys 900, 1000 to wobble back and forth and side to side when an animal chews, rolls and/or pushes pet toys 900, 1000.

Although the present invention has been described with reference to preferred embodiments, workers skilled in the art will recognize that changes may be made in form and detail without departing from the spirit and scope of the invention.

What is claimed is:

1. A non-consumable pet toy comprising:
   a body having a first treat-retaining cavity;
   a first opening that extends between the first treat-retaining cavity and an outer surface of the body; and
   a first metering device in the first opening that dispenses treats from the first treat-retaining cavity through the first opening at a metered rate, and being refillable through the metering device, the first metering device extending into the treat retaining cavity from the first opening.

2. The non-consumable pet toy of claim 1 and further comprising a second opening that extends between a second treat-retaining cavity and the outer surface of the body, wherein a second metering device is in the second opening that dispenses treats from the second treat-retaining cavity.

3. The non-consumable pet toy of claim 2, wherein the first treat-retaining cavity is joined to the second treat-retaining cavity by a coupling member.

4. The non-consumable pet toy of claim 1, wherein the outer surface comprises a plurality of grooves.

5. The non-consumable pet toy of claim 1, wherein the pet toy is constructed of a resilient material.

6. The non-consumable pet toy of claim 5, wherein the material is an elastomer.

7. The non-consumable pet toy of claim 1, wherein the first metering device comprises a flexible material and the first treat-retaining cavity comprises a stiff material.

8. The non-consumable pet toy of claim 1, wherein the first metering devices comprises a stiff material and the first treat-retaining cavity comprises a flexible material.

9. The non-consumable pet toy of claim 2, wherein the first metering device comprises a plurality of elongated members extending into the first treat-retaining cavity from the first opening.

10. A non-consumable pet toy comprising:
    a molded body that defines at least one treat-retaining cavity;
    an opening that extends between the treat-retaining cavity and an outer surface of the body; and
    a metering device that dispenses treats from the treat-retaining cavity and including a plurality of elongated members extending into the treat-retaining cavity from the opening.

11. The non-consumable pet toy of claim 10, wherein the metering device is affixed to the opening with an adhesive.

12. The non-consumable pet toy of claim 10, wherein the metering device comprises:
    an annulus configured to be positioned in the opening, the annulus having a first surface adjacent the outer surface of the body, and
    wherein the elongated members extend from a second surface of the annulus into the treat-retaining cavity.

13. The non-consumable pet toy of claim 12, wherein the opening includes a constricted portion and a seat portion, the seat portion sized to receive the annulus, the constricted portion sized to resist removal of the annulus from the seat portion.

14. The non-consumable pet toy of claim 12, wherein the elongated members terminate at distal points from the annulus and are normally arranged in a substantially circular arrangement.

15. The metering device of claim 14, wherein a diameter of the circular arrangement is less than a diameter of the annulus.

16. The metering device of claim 10, wherein the elongated members comprise a plurality of narrow fingers.

17. The metering device of claim 10, wherein the elongated members comprise a plurality of broad tongues.

\* \* \* \* \*